(12) United States Patent
Hirata et al.

(10) Patent No.: US 6,969,043 B2
(45) Date of Patent: Nov. 29, 2005

(54) SOLENOID VALVE (75) Inventors: Ichiro Hirata, Fujisawa (JP); Norio Uemura, Fujisawa (JP); Yoshinari Kasagi, Fujisawa (JP); Tadashi Yamaguchi, Saga (JP)

(73) Assignee: NOK Corporation, Tokyo (JP)

( * ) Notice: Subject to any disclaimer, the term of this patent is extended or adjusted under 35 U.S.C. 154(b) by 73 days.

(21) Appl. No.: 10/398,658

(22) PCT Filed: Oct. 16, 2001

(86) PCT No.: PCT/JP01/09072

§ 371 (c)(1),
(2), (4) Date: Aug. 22, 2003

(87) PCT Pub. No.: WO02/35126

PCT Pub. Date: May 2, 2002

(65) Prior Publication Data
US 2004/0031941 A1 Feb. 19, 2004

(30) Foreign Application Priority Data
Oct. 16, 2000 (JP) ............................. 2000-315140

(51) Int. Cl.[7] .............................................. F16K 31/02
(52) U.S. Cl. .................... 251/129.15; 251/366
(58) Field of Search ...................... 251/129.15, 129.18, 251/129.08, 366; 137/625.65

(56) References Cited

U.S. PATENT DOCUMENTS

| 3,921,670 | A | * | 11/1975 | Clippard et al. | ....... 251/129.15 |
| 5,080,288 | A | * | 1/1992 | Shen | ..................... 251/129.15 |
| 5,392,995 | A | * | 2/1995 | Wahba | ................... 251/129.15 |
| 5,992,822 | A | * | 11/1999 | Nakao et al. | .......... 251/129.15 |
| 6,024,302 | A | * | 2/2000 | Sumida et al. | ......... 251/129.15 |
| 6,305,583 | B1 | * | 10/2001 | Ward et al. | ............ 251/129.15 |

FOREIGN PATENT DOCUMENTS

| JP | 61-28547 | 8/1986 |
| JP | 61-184174 | 11/1986 |
| JP | 07-280122 | 10/1995 |
| JP | 2000-249247 | 9/2000 |

* cited by examiner

Primary Examiner—John Bastianelli
(74) Attorney, Agent, or Firm—Jacobson Holman PLLC (57) ABSTRACT

A substantially cylindrical annular space is formed by an outer circumferential surface of a cylindrical portion and a substantially flat surface portion of a substantially bottomed cylindrical sleeve, an inner circumferential surface of a case member, and a substantially flat surface portion of a bracket plate, a seal member being provided in this annular space. Thus, the simplification of the construction, and the miniaturization and the reduction of the weight is realized while a sealing performance between the inside and outside of the main body is maintained.

4 Claims, 6 Drawing Sheets

SOLENOID VALVE

This is a nationalization of PCT/JP01/09072, filed Oct. 16, 2001 and published in Japanese.

TECHNICAL FIELD

This invention relates to a solenoid valve suitably used for controlling, etc., pressures of various kinds of fluids.

BACKGROUND ART

Figure 7:
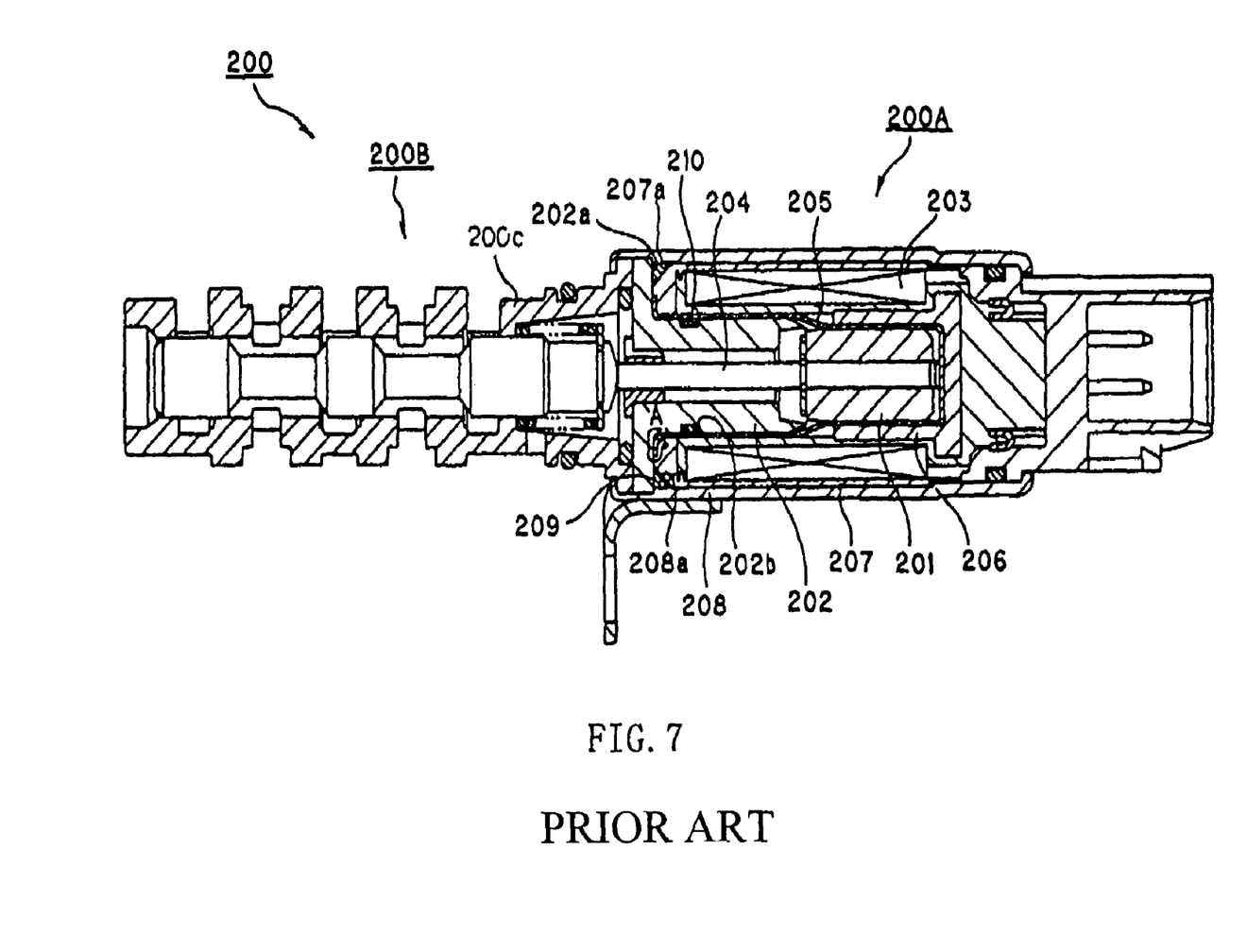
FIG. 7 is a schematic construction diagram in section of a conventional art solenoid valve.

The conventional art solenoid valves of this kind include, for example, a solenoid valve shown in FIG. 7. FIG. 7 is a schematic construction diagram in section of the conventional art solenoid valve.

The solenoid valve 200 includes a solenoid portion 200A, and a valve portion 200B.

Here, in the illustrated example, the valve portion 200B represents a spool valve type capable of controlling an inflow rate and an outflow rate of a fluid by varying a cross-sectional area of an opening of the valve in accordance with a stroke of a spool.

The solenoid portion 200A is generally provided with a substantially cylindrical coil 203 adapted to generate a magnetic field when it is energized, a plunger 201 magnetically attracted to a center post 202 by the magnetic field generated in the coil 203, a rod 204 connected to the plunger 201 so as to transmit a driving force of the plunger 201 to the valve portion 200B (spool specifically), and a substantially bottomed cylindrical metal sleeve 205 provided so as to cover the outer surfaces of the plunger 201 and center post 202 for the purpose of positioning (centering) the plunger 201 and center post 202.

Besides, the solenoid portion 200A is provided with an upper plate 206 forming a magnetic path, a molded section 207 in which the coil 203 is integrally molded, and a metal case member 208 in which these members are held.

Also, the center post 202 is provided with a plate portion 202a extended to radial direction in the vicinity of an opened end of the sleeve 205. At the end surface of the molded section 207 which is on the side of the plate portion 202a, an inclined surface 207a is provided. These plate portion 202a, inclined surface 207a and an inner circumferential surface 208a of a case member 208 form a substantially cross-sectionally triangular annular space.

This annular space is provided therein with a first O-ring 209, which closely contacts the plate portion 202a, inclined surface 207a and inner circumferential surface 208a of the case member 208. Thus, the entry of the water (contaminants), which causes a poor insulation of the coil and the short-circuiting thereof, from the outside into an inner portion (bobbin) of a body of the solenoid valve 200 is prevented.

The cause of the poor insulation of this coil or the cause of the short-circuiting thereof will now be described in detail. The portion of the center post 202 and that of a valve sleeve 202c at which these two parts are fixed to each other by case-caulking are liable to cause deformation, which results in a gap between these parts.

Moreover, at the metal upper plate 206 and an integrally molded portion of a resin provided on the periphery thereof, a gap between these portions occurs due to the expansion and contraction thereof ascribed to the variation of the temperatures, because the metal and resin are comparatively different in a coefficient of linear expansion.

Therefore, the water flows from the outer side, and through the gap in the case caulked portions, and the water then flows from this gap in the case caulked portions and through the gap between an inner circumferential surface of the case and an outer circumferential surface of the molded portion, and/or from the gap between the inner circumference of the bobbin and the outer circumference of the sleeve and through the gap between the upper plate and resin portion to enter the coil portion.

The center post 202 is provided in an outer circumference thereof with an annular groove 202b, in which a second O-ring 210 is also provided. Since the second O-ring 210 closely contacts an inner circumference of the sleeve 205, a fluid (oil in a hydraulic pressure control-dedicated) in the solenoid valve body is prevented from flowing to the outside.

The operation of the solenoid valve 200 will now be described.

The plunger 201 is formed so that when the plunger is in a normal condition, i.e., when the coil 203 is not energized, the plunger 201 is positioned in the direction in which the plunger is separated from the center post 202.

The plunger is generally formed so that the plunger is urged by an urging member, such as a spring and the like in the direction in which the plunger 201 is separated from the center post 202. In the illustrated example, a spring for urging the spool toward the solenoid portion 200A is provided, by which the plunger is separated from the center post 202 via the spool.

Also, when the coil 203 is energized, the coil 203 generates a magnetic field and a magnetic path is formed. The plunger 201 is then magnetically attracted to the center post 202.

Accordingly, a magnetic force can be controlled in accordance with a level of the electric current supplied to the coil 203. When a quantity of movement of the plunger 201 is thereby controlled, a quantity of stroke of the spool can be controlled. This enables a flow rate of the fluid to be controlled, and pressures of various kinds of fluids to be controlled such as a hydraulic pressure control.

However, in the above-described conventional art, the following problems occurred.

As described above, between the inside and the outside of the main body of the solenoid valve 200 in order to prevent the entry of the water (contaminants), which causes a poor insulation of a coil and the short-circuiting thereof, and the leakage of the fluid from the inner portion, it was necessary that two O-rings (first O-ring 209 and second O-ring 210) be provided.

Incidentally among the members constituting the solenoid valve body 200, the center post 202, sleeve 205 and case member 208, etc. are made of a metal, while the molded portion 207, and bobbin around which the coil 203 is wound, etc. are made of a resin.

In particular, the first O-ring 209 prevents the water on the outer side of the valve from flowing from the caulked portion of the case, and through the gap between the outer circumference of the mold coil and the inner circumference of the case and/or a gap between the inner circumference of the bobbin and the outer circumference of the sleeve, and then through the gap between the upper plate and resin (mold) to enter the inner portion of the coil, and thereby prevents the poor insulation and short-circuiting of the solenoid from occurring.

Also the second O-ring 210 is provided mainly for the purpose of preventing the leakage of the fluid from the inner portion.

This is because the leakage of the fluid (oil) in the direction of an arrow A in FIG. 7 causes the fluid to permeate and leak into the connector portion, etc. and results in the malfunctions of gathering the oil in the connector, etc. if the second O-rings 210 is not provided. The leakage is caused by the gaps between the metal sleeve 205 and molded portion 207, between the metal sleeve 205 and bobbin, and between the metal upper plate 206 and bobbin because gaps readily occur between the metal members and resin members as mentioned above.

Under the circumstances, the second O-ring 210 closely contacting the metal center post 202 and sleeve 205 delivers a high sealing performance.

Although a sufficient sealing performance is thus displayed owing to the use of the two O-rings, an increase in the number of parts and the complication of the construction were invited.

It is necessary that an annular groove 202b be provided in the center post 202 for fitting the second ring 210 therein, a magnetic flux is hard to be formed between the portion which is provided with the annular groove 202b and coil 203. This constituted a factor of causing the solenoid valve 200 itself to be enlarged for securing a required magnetic flux.

An object of the present invention is to provide a solenoid valve which has attained the simplification of the construction, the miniaturization and the reduction of the weight while the sealing performance between inner and outer of the main body is maintained.

DISCLOSURE OF THE INVENTION

To achieve these objects, the present invention provides (1) a solenoid valve having:

a substantially cylindrical coil adapted to generate a magnetic field when it is energized, a center post provided concentrically with the cylindrical coil, a plunger adapted to be magnetically attracted to the center post by a magnetic field generated by the coil, a substantially bottomed cylindrical metal sleeve provided so as to cover outer circumferential surfaces of the center post and plunger, a metal plate provided in the vicinity of an opening end of the sleeve and having a substantially flat surface portion extending to radial direction, and a metal case member containing these coil, center post, plunger, sleeve and plate, the solenoid valve including a collar provided on the sleeve and extending toward an inner circumferential surface of the case member, an annular space formed among one surface of the collar, an inner circumferential surface of the case member and a substantially flat surface portion of the plate, and a seal member provided in the space and adapted to seal each of one surface of the collar, the inner circumferential surface of the case member and the substantially flat surface portion of the plate.

According to this structure, the seal member seals each of the inner circumferential surface of the case member and the substantially flat surface portion of the plate, so that the entry of the water (contaminants), which causes a poor insulation of the coil and the short-circuiting, from the outside can be prevented. Moreover, the sealing of the substantially flat surface portion of the plate and one surface of the collar enables the leakage of the fluid from an inside to be prevented. Therefore, one seal member enables the entry of water (contaminants), which causes a poor insulation of the coil and the short-circuiting thereof, from the outside, and the leakage of the fluid from an inside to be prevented.

It is recommendable to:

form the annular space to a substantially cylindrical shape by the outer circumferential surface formed by extending the collar in the direction separating from the plate, and the substantially flat surface portion formed by bending the end portion of this outer circumferential surface toward the inner circumferential surface of the case member, provide the seal member with:

a seal portion which forms a first seal surface with the substantially flat surface portion of the plate, a contact portion contacting the substantially flat surface portion of the collar, and a position restricting portion adapted to be brought into contact with the outer circumferential surface portion of the collar and restricting a radial inward movement, render at least either one of the seal portion and contact portion flexible deformable toward the inner circumferential surface of the case member and form a second seal surface with the inner circumferential surface of the case member, and form a third seal surface between at least either one of the contact portion and position restricting portion and the collar.

According to this structure, a radial inward movement is restricted with the position restricting portion, so that the sealing performance of the second seal surface even with respect to a variation of an axial size is maintained. Moreover, when a load is imparted in the axial direction, a sufficient sealing performance is delivered by either one of the seal portion flexibly deformable toward the inner circumferential surface of the case member and the contact portion.

It is recommended that the annular space be formed to a substantially triangular cross-sectional shape by inclining the collar so that the collar becomes distant from the plate from a position in which the collar contacts the plate toward the inner circumferential surface of the case member, and that:

the seal member be made of an O-ring adapted to seal each of the inclined surface of the collar, the inner circumferential surface of the case member and the substantially flat surface portion of the plate.

Owing to this structure, one seal member, i.e. even such a simple seal member as the O-ring can prevent the entry of the water (contaminants), which causes a poor insulation of the coil and the short-circuiting, from the outside, and the leakage of a fluid from inside.

It is recommended that the collar be formed out of an elastically deformable elastic material, and that:

the collar be disposed so as to press the seal member by an elastic resilience of the collar.

This arrangement enables a variation of the sizes of the seal member and seal space to be absorbed.

The solenoid valve (2) according to the present invention is provided with:

a seal member adapted to seal at once a clearance between a valve portion and an inner portion of a coil, and a clearance between an outer portion and the inner portion of the coil, at least a part of an outer wall forming a seal space in which the seal member is disposed being formed by an elastically deformable plate type member, the plate type member being disposed so as to press the seal member by an elastic resilience.

Therefore, a variation of the sizes of the seal member and seal space can be absorbed.

The feature resides in that a restricting portion for restricting a deformation region of the plate type member is provided so that the deformation of the plate type member is held in an elastic range.

This can prevent the plate type member from being plastically deformed.

BEST MODE FOR CARRYING THE INVENTION

Preferred of embodiment of the present invention will now be illustratively described in detail referring to the drawings. The size, material, shape and relative disposition and the like of the constituent parts described in the embodiment do not intend to limit the scope of the invention only thereto unless a specific description is given in particular.

(First Embodiment)

A first embodiment of the solenoid valve according to the present invention will now be described referring to FIG. 1 and FIG. 2.

Figure 1:
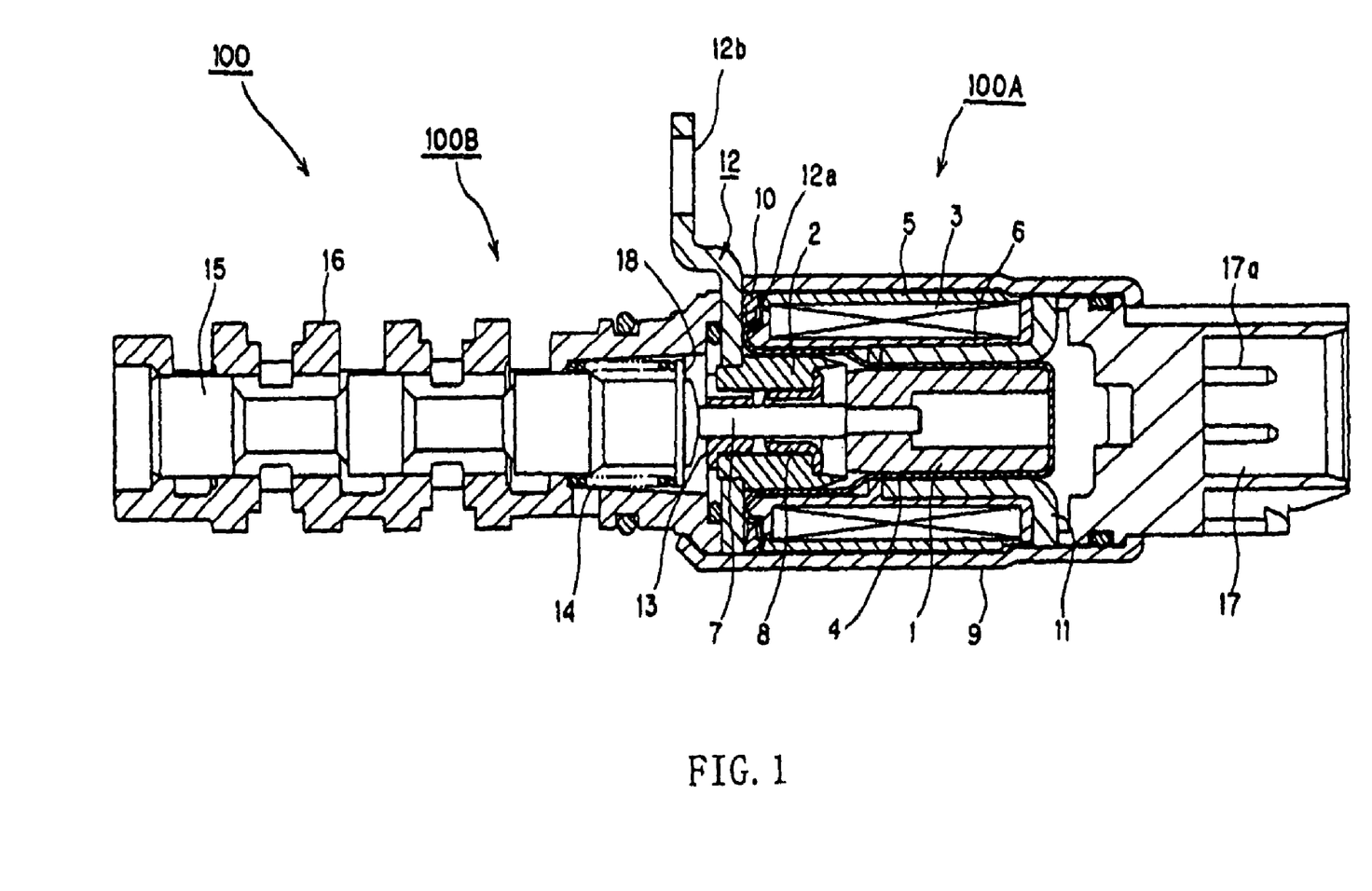
FIG. 1 is a schematic construction diagram in section of a first embodiment of the solenoid valve according to the present invention.
Figure 2:
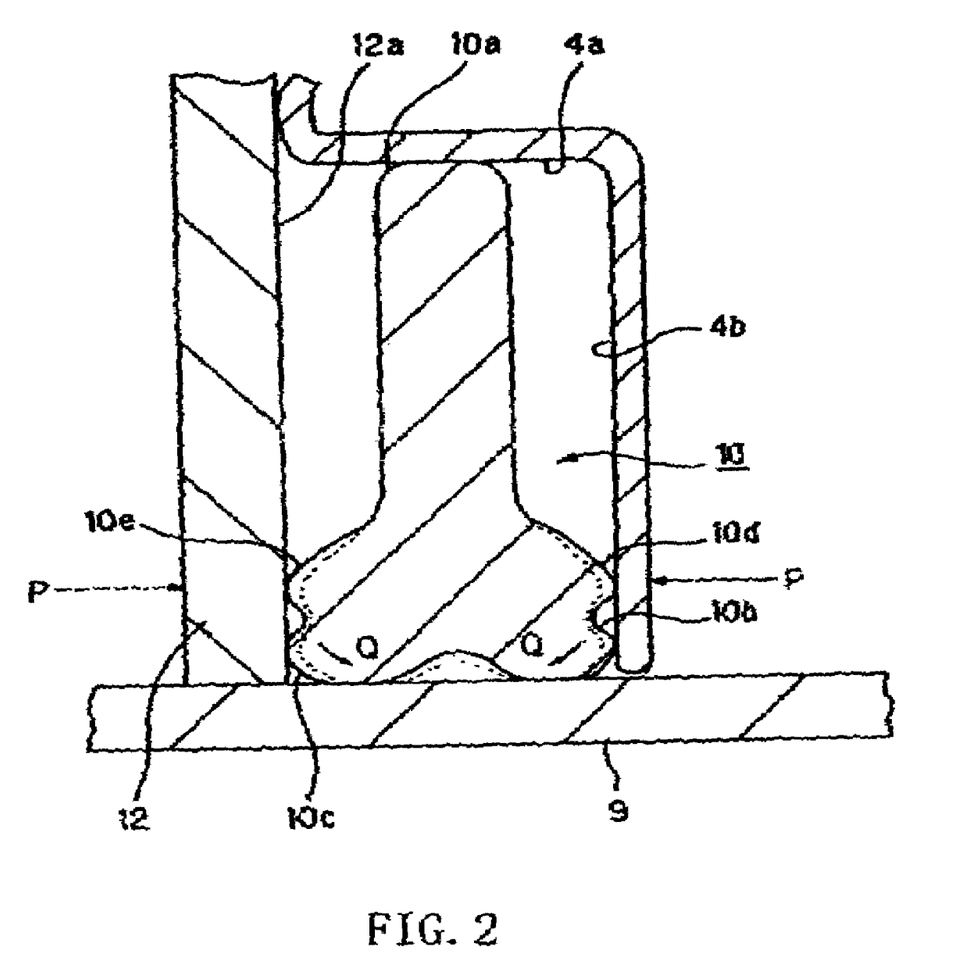
FIG. 2 is a schematic construction diagram in section showing a seal member in an installed state in the first embodiment of the present invention.

FIG. 1 is a schematic construction diagram in section of the first embodiment of the solenoid valve according to the present invention, and FIG. 2 is a schematic construction diagram in section of a seal member in an installed state in the first mode of embodiment of the present invention.

A solenoid valve 100 includes a solenoid portion 100A and a valve portion 100B.

Here, the valve portion 100B in the illustrated embodiment is made of a spool valve. That is, the valve portion 100B is formed with a spool 15 provided in the interior of a valve sleeve 16 so that the spool 15 can be reciprocated therein, the area of an opening of the valve formed in the valve sleeve 16 varies in accordance with a stroke of the spool 15. Therefore, the controlling of a quantity of stroke of the spool 15 by the solenoid enables an inflow rate and an outflow rate of a fluid to be controlled.

The solenoid portion 100A is generally provided with a substantially cylindrical coil 3 adapted to generate a magnetic field by energizing, a plunger 1 adapted to be magnetically attracted to a center post 2 when a magnetic circuit is formed by a magnetic field generated owing to energize the coil 3, a substantially bottomed cylindrical metal sleeve 4 constituting a bearing for the plunger 1, and a rod 7 connected to the plunger 1 for transmitting a driving force of the plunger 1 to the spool 15.

The solenoid portion 100A is also provided with a bracket plate 12 which has a substantially flat section 12a extended to radial direction so as to form a magnetic path, and which has a bracket 12b for fixing a solenoid valve body in a predetermined position, and a case member 9 holding therein various kinds of constituent members including a coil 3, a center post 2, a plunger 1, sleeve 4 and bracket plate 12.

The solenoid portion 100A is further provided with a bobbin 6 around which the coil 3 is wound, a shim 8 for having the plunger 1 separate from the center post 2 easily, an upper plate 11 adapted to form a magnetic path, a bearing 13 for a rod 7, a spring 14 adapted to urge an E-type ring 18 fixed to the spool 15, and thereby urge the plunger 1 via the spool 15 and rod 7 in the direction in which the plunger 1 separates from the center post 2, and a connector 17 having a terminal 17a for energizing the coil 3.

The coil 3 and bobbin 6 are assembled by molding, and form a molded coil sub-assembly 5.

This embodiment is also provided with a seal member 10 which prevents the leakage of a fluid from an inner section of the valve portion 100B toward the coil 3, and the entry of the water (contaminants), which causes a poor insulation of the coil and the short-circuiting thereof, from the outside; and which constitutes a main member of the characteristics of this embodiment.

The operation of the solenoid valve 100 will now be described.

The plunger 1 is formed so that, when the plunger 1 is in a normal condition, i.e., in the condition in which the coil 3 is not energized, the plunger 1 is positioned in the direction in which the plunger 1 is separated from the center post 2. Namely, in this embodiment, the plunger 1 is separated from the center post 2 when the spool 15 is urged toward the solenoid portion 100A via the E-type ring 18 as mentioned above.

Also, when the coil 3 is energized, a magnetic path (a magnetic path formed by the case member 9, upper plate 11, plunger 1, center post 2, and bracket plate 12) is formed, and the plunger 1 is magnetically attracted to the center post 2. Therefore, a magnetic force can be controlled in accordance with the magnitude of the electric current supplied to the coil 3. When the quantity of movement of the plunger 1 is thereby controlled, the quantity of stroke of the spool 15 can be controlled. This enables a flow rate of a fluid to be controlled, and the controlling of various kinds of fluid pressures and etc. including the controlling of a hydraulic pressure to be done.

The structure in this embodiment is not similar to a general structure of the solenoid in which both end portions of a plunger are supported on a bearing respectively, but is formed so that the plunger 1 is supported on bearings by the sleeve 4. Accordingly, the number of members (S members including plunger 1, rod 7, center post 2, sleeve 4 and rod bearings 13) having relation with the centering of the valve is comparatively small, so that a load on the managing of the sizes is low. Furthermore, this solenoid valve is advantageous in that an axial direction can be miniaturized as compared with a case where a bearing structure is needed at both end portions respectively of the plunger.

The seal member 10 will now be described more in detail referring to, especially, FIG. 2.

This embodiment of the present invention is formed such that the portion of a collar which is at an end portion of an opening of the substantially bottomed cylindrical sleeve 4 is extended to a position in the vicinity of an inner circumferential surface of the case member 9. In this mode of embodiment, a cylindrical portion 4a is formed by bend from a position contacting the substantially flat surface portion 12a and extension in the direction separating from the substantially flat portion and a substantially flat surface portion 4b is formed by further bend toward an inner circumferential surface of the case member 9.

A substantially cylindrical annular space is thus formed by an outer circumferential surface of the cylindrical portion 4a, substantially flat surface section 4b, an inner circumferential surface of the case member 9, and a substantially flat surface portion 12a of the bracket plate 12.

The seal member 10 is provided in this annular space.

The seal member 10 is generally provided with a position restricting portion 10a adapted to contact the outer circumferential surface of the cylindrical portion 4a of the collar of the sleeve 4 and restricted with respect to a radial inward movement, a contact portion 10b adapted to contact the substantially flat section 4b of the collar of the sleeve 4, and a seal portion 10c adapted to seal the substantially flat surface portion 12a of the bracket plate 12.

In this mode of embodiment, a first seal surface is formed between the seal portion 10c and the substantially flat surface portion 12a of the bracket plate 12, and a second seal surface is formed between the seal portion 10c and the inner circumferential surface of the case member 9 and between the contact section 10b and the inner circumferential surface of the case member 9. A third seal surface is formed between the contact portion 10b and the substantially flat surface portion 4b of the collar of the sleeve 4 and between the position restricting portion 10a and an outer circumferential surface of the cylindrical portion 4a of the collar of the sleeve 4.

In this mode of embodiment, the contact portion 10b and seal portion 10c are formed so that these portions can be flexibly deformed toward the inner circumferential surface of the case member 9.

Since the contact portion 10b and seal portion 10c are thus formed as flexible lips, satisfactory sealing becomes possible even with respect to the existence of a variation of the sizes of the annular space.

In particular, in this embodiment, the lip-like contact portion 10b and seal portion 10c are provided so that the cross-section becomes a substantially U-shape in the vicinity of the-inner circumferential surface of the case member 9. Therefore, the flexibility in the axial direction is sufficiently obtained so that these portions can display a sufficient sealing performance even with respect to the existence of a variation of the axial sizes. When a load is imparted in the axial direction (in the direction of an arrow P in FIG. 2), each of the lip is bent (as shown by broken lines in FIG. 2) in the axially inward direction (in the direction of an arrow Q in FIG. 2), so that the sealing performance with respect to the inner circumferential surface of the case member 9 can be secured or backed up.

Namely, in the solenoid valve of the type in which the axial size is larger than the diametrical size with each member fixed by axially caulking the end portion of the case member 9 just as in this embodiment, a variation of the sizes in the axial direction is liable to become larger (by around 3 to 4 times in dimensional tolerance) as compared with that of the sizes in the diametrical direction, and a load is imparted to the solenoid valve in the axial direction during the caulking operation. However, when the above-mentioned seal member 10 is used, a sufficient sealing performance of the solenoid valve can be secured.

In this embodiment, an annular projection 10d is provided in the vicinity of a root of the lip of the contact portion 10b, and an annular projection 10e in the vicinity of the lip of the seal portion 10c.

Accordingly, shown in the drawing, a sealing operation may be aided by bringing the annular projection 10d into close contact with the substantially flat portion 4b of the collar, and bringing the annular projection 10e into close contact with the substantially flat surface 12a of the bracket plate 12.

Owing to the above-described structure, the seal portion 10c of the seal member 10 seals the substantially flat portion 12a of the metal bracket plate 12, and also the inner circumferential surface of the metal case member 9. This enables the entry of the water (contaminants), which causes a poor insulation of the coil and the short-circuiting thereof, from the outside to be prevented.

Also, since the position restricting portion 10a of the seal member 10 seals the outer circumferential surface of the cylindrical portion 4a of the collar of the metal sleeve 4, the leakage of a fluid from an inner portion of the solenoid valve can be prevented. Furthermore, since the contact portion 10b seals the substantially flat surface portion 4b of the collar of the metal sleeve 4, the leakage of the fluid can be doubly prevented.

Thus, it becomes possible by one seal member 10 to simultaneously prevent the entry of the water (contaminants), which causes a poor insulation of the coil and short-circuiting, from the outside, and the leakage of a fluid from an inner portion of the solenoid valve.

Therefore, the reduction of the number of parts and the simplification of the construction of the solenoid valve become possible as the excellent sealing performance is maintained. Unlike a conventional art solenoid valve of this kind, it is unnecessary that an annular groove for fitting an O-ring be provided in the center post. Therefore, even when the center post is made smaller, a magnetic path can be secured satisfactorily, so that the dimensions and weight of the solenoid valve can be reduced.

Incidentally, the above-described embodiment shows a case where all of the contact portion 10b and seal portion 10c is formed so as to be flexibly deformable, and so as to provide a second seal surface with the inner circumferential surface of the case member 9. However, either one only of them may be formed so as to be flexibly deformable, and so as to provide a second seal surface is formed with the inner circumferential surface of the case member 9.

Furthermore although the above-described embodiment shows a case where all of the position restricting portion 10a and contact portion 10b are formed so that they constitute the third seal surfaces with the collar of the sleeve 4, it is also possible that the third seal surface is formed with only one of them, and that the other is simply brought into contact.

Figure 3:
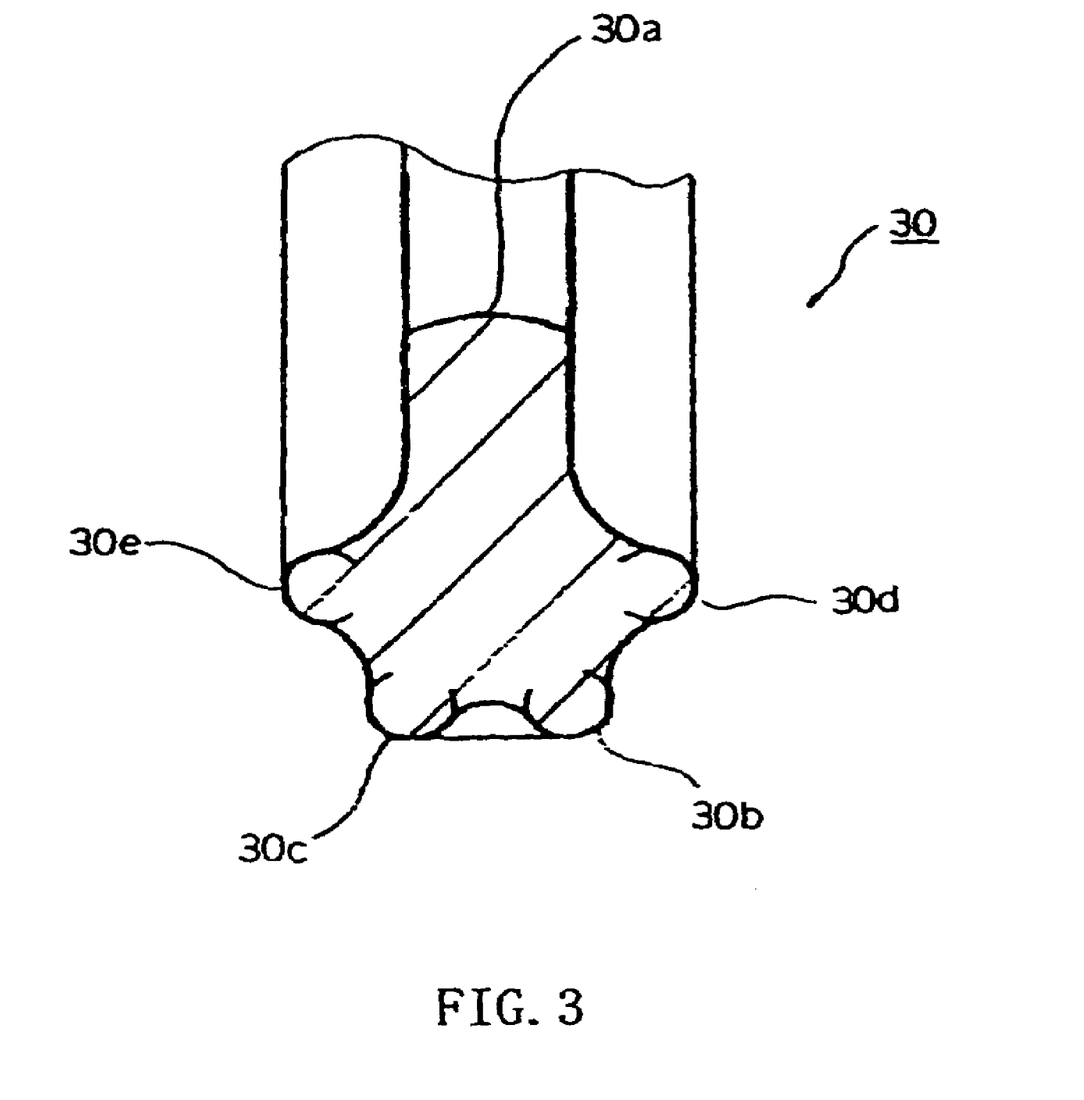
FIG. 3 is a partially cutout view in section showing a modified example of the seal member.

The construction of the seal member is not limited to that shown in FIG. 2 but the construction shown in, for example, FIG. 3 may also be employed.

A seal member 30 shown in FIG. 3 is generally provided with a position restricting portion 30a adapted to be brought into contact with an outer circumferential surface of a cylindrical portion 4a of a collar of a sleeve 4 and thereby restricted with respect to an inward movement, a contact portion 30d adapted to contact a substantially flat surface portion 4b of a collar of a sleeve 4, a first seal portion 30e adapted to seal a substantially flat surface 12a of a bracket plate 12, and a second seal portion 30b and a third seal portion 30c adapted to seal an inner circumferential surface of a case member 9. Namely, the contact portion 10b of the seal member 10 shown in FIG. 2 is divided into the second seal portion 30b and the contact portion 30d in the seal member 30 shown in FIG. 3. Also, the seal portion 10c of the seal member 10 shown in FIG. 2 is divided into the first seal portion 30e and the third seal portion 30c in the seal member 30 shown in FIG. 3.

Also, the first seal portion 30e forms a first seal surface, the second seal portion 30b and third seal portion 30c form a second seal surface, and the position restricting portion 30a and contact portion 30d form a third seal surface.

Also, the second seal portion 30b, third seal portion 30c, contact portion 30d and first seal portion 30e are made flexibly deformable.

Accordingly, a stable sealing performance can be maintained even with respect to even a variation of the sizes thereof in the same manner as the seal member 10 shown in FIG. 2.

A preferred applied example of the solenoid valve 100 in this embodiment will now be described.

In an engine for an automobile and etc. intake and exhaust valves of the engine are opened and closed in accordance with a rotation of a camshaft. When the timing of the valve is controlled suitably in accordance with the operating condition (high speed, low speed), the fuel efficiency can be improved, and a high exhaust gas purification can be obtained.

This control for valve timing can be done by changing a phase by shifting the camshaft in the rotational direction. The techniques for carrying out it by a solenoid valve are known as known techniques.

Here, in order to shift the camshaft in the rotational direction, a hydraulic pressure control by the solenoid valve is necessarily carried out. The solenoid valve is generally provided on a path of an engine oil flow passage in relation to spaces for installation and etc. and uses the engine oil.

Conventionally, control were separately carried out according to the two kinds of condition of a high-speed condition and a low-speed condition by using a solenoid valve adapted to carry out an ON-OFF control. However, in recent years, a solenoid valve capable of carrying out a linear control has come to be used so as to carry out a more highly accurate control.

Therefore, the solenoid valve according to the above-described embodiment of the present invention becomes possible to be used suitably as such a valve timing control (VTC) linear control solenoid valve.

(Second Embodiment)

Figure 4:
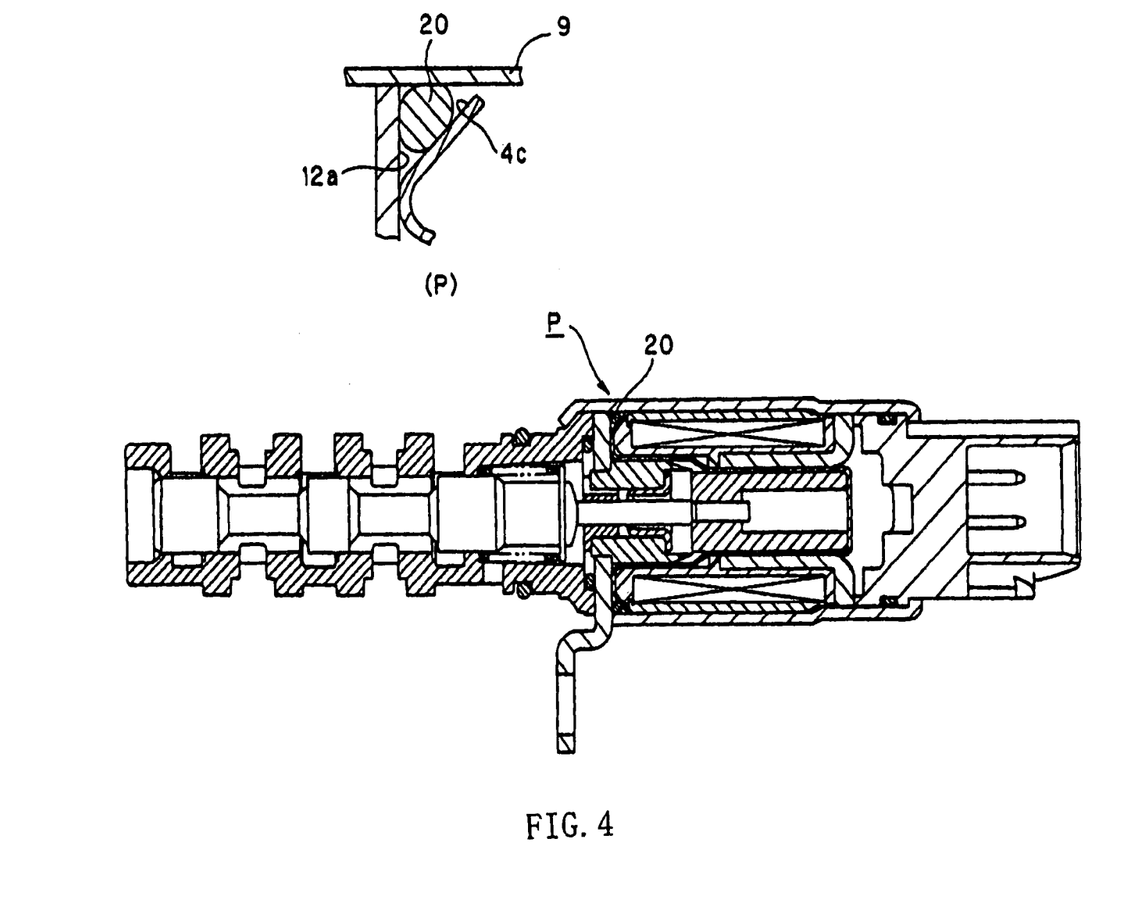
FIG. 4 is a schematic construction diagram in section of a second embodiment of the solenoid valve according to the present invention.

FIG. 4 shows a second embodiment. In the first embodiment, a case where an annular space is formed in a substantially cylindrical shape with a substantially rectangular cross section and it receives a seal member of a special shape, which can deal with variations of the axial dimensions and shape, was described. In the second embodiment, a case where an annular space is formed to a substantially triangular cross sectional shape with a three-surface sealing in which each surface is sealed by O-rings will be described.

The other construction and function are identical with those of the first embodiment, so that a description of the same parts will be omitted.

FIG. 4 is a schematic construction diagram in section of the solenoid valve according to a second embodiment of the present invention. A seal portion shown by an arrow P in the drawing is shown on an enlarged scale (P) in the drawing.

In the embodiment of the present invention, a collar at an end portion of an opening of a substantially bottomed cylindrical sleeve 4 is formed so as to extend to the vicinity of an inner circumferential surface of a case member 9. In this embodiment, an inclined surface 4c is provided which is formed by bending the collar at the portion which contacts a substantially flat surface portion 12a of a bracket plate 12, and which extends gradually away from the substantially flat surface portion 12a with extending toward an inner circumferential surface of the case member 9.

Thus, an annular space of a substantially triangular cross-sectional shape is formed by these inclined surface 4c of the sleeve 4, inner circumferential surface of the case member 9 and substantially flat surface portion 12a of the bracket plate 12.

Also, in this annular space, a seal member 20 is provided.

The seal member 20 in this embodiment is an O-ring serving as a three-surface seal contacting closely and sealing all of the inclined surface 4c of the sleeve 4, the inner circumferential surface of the case member 9 and the substantially flat surface portion 12a of the bracket plate 12.

Owing to such a structure, the seal member 20 closely contacts the substantially flat surface portion 12a of the metal bracket plate 12 and also the inner circumferential surface of the metal case member 9, and the entry of the water (contaminants), which causes a poor insulation of a coil and the short-circuiting, from the outside becomes possible to be prevented.

Since the seal member 20 closely contacts the inclined surface 4c of the collar of the metal sleeve 4, the leakage of a fluid from the interior of a solenoid valve can be prevented.

Thus, the prevention of the entry of the water (contaminants), which causes a poor insulation of the coil and the short-circuiting thereof, from the outside, and the leakage of the fluid from an inner portion become able to be carried out at once by one seal member 20, and the same effect as in the first mode of embodiment can be obtained.

In this embodiment, an O-ring that whose construction is simple is used as a seal member, so that the construction of a seal member-installing portion is also naturally simple. This enables the construction of the solenoid valve to be more simplified.

(Third Embodiment)

The solenoid valve according to the present invention of a third embodiment will now be described referring to FIG. 5. Incidentally, in this embodiment the construction except the construction of a seal member and a collar of a sleeve 4 is identical with the first embodiment. Therefore, they only will be described in detail, and a description of the other construction will be omitted.

Figure 5:
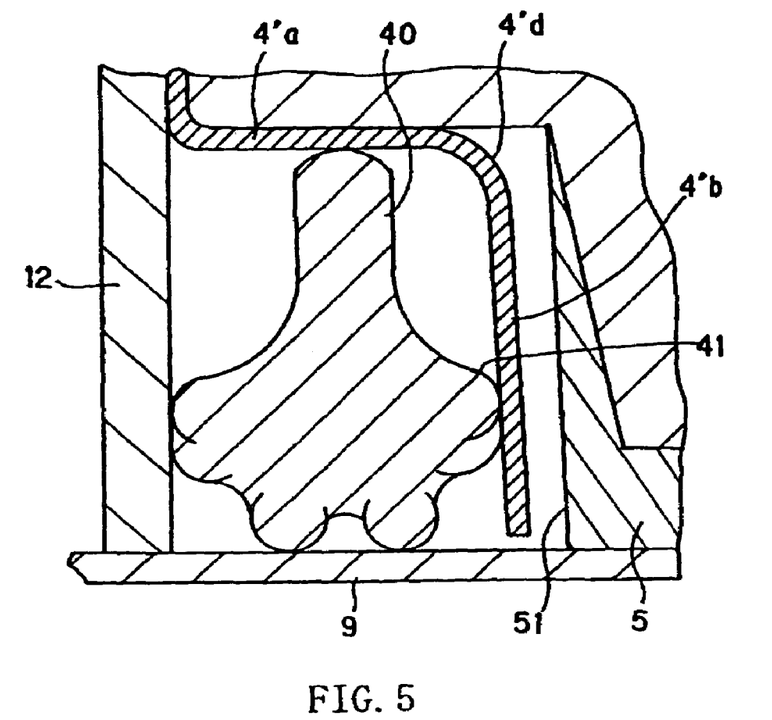
FIG. 5 is a schematic construction diagram in section of a seal member in an installed state in a third embodiment of the present invention.

FIG. 5 is a schematic construction diagram in section of the seal member in an installed state according to the third embodiment of the present invention.

In this embodiment, a substantially flat surface portion 4'b of a collar of a sleeve 4 is made elastically deformable. Namely, a substantially flat surface portion 4'b is formed as a flexible leaf spring in which a bent portion 4'd between a cylindrical portion 4'a and substantially flat surface portion 4'b works as a base point where a power is received.

When a seal member 40 is installed in such a structure, the substantially flat surface 4'b is pressed and bent by contact portion 41 provided on the seal member 40. As a result, the contact portion 41 provided on the seal member 40 is pressed by an elastic resilience of the substantially flat surface portion 4'b.

Therefore, owing to a synergistic effect of the elastic resilience of the seal member 40 and that of the substantially flat surface portion 4'b, sufficient sealing performance is delivered.

Here, a seal space (annular space) in which this seal member is installed is formed by the collar of the sleeve 4, an inner circumferential surface of a case member 9 and a substantially flat surface portion 12a of the bracket plate 12. Due to a variation of the sizes of these members, the dimensions of the seal space vary.

A variation also occurs in the sizes of the seal member 40.

However, when a part (the substantially flat surface portion 4'b which also constitutes a part of the collar) of an outer wall forming the seal space is made of an elastically deformable elastic material as in this embodiment, the above-mentioned variation of the dimensions can be absorbed.

Therefore, even when the volume of the seal member is large with respect to seal space, an increasing crushing load deforms the substantially flat surface portion 4'b, and enlarges the seal space, so that a stable sealing performance can be obtained without causing a packing rate of the seal member to exceed 100%.

Since the deformation of substantially flat surface portion 4'b enlarges the seal space, an installing load of the seal member can be reduced without causing the packing rate to increase to an excessively high level, and an installing efficiency is improved.

Thus, with respect to a variation of the sizes of the seal space and a variation of the sizes of the seal member, an insufficient tightening margin (crushing margin) of the seal member or an excess of the packing rate of the seal member over 100% can be prevented.

In this embodiment, an end surface 51 of a molded portion of a molded coil sub-assembly 5 is given a function as a restricting portion for restricting a deformation region of the substantially flat surface portion 4'b.

This enables the deformation region of the substantially flat portion 4'b to be restricted within an elastic range and the plastic deformation of the substantially flat portion 4'b to be prevented.

Incidentally, as a material (material for the sleeve 4) for the substantially flat surface portion 4'b, for example, stainless steel can be suitably used.

Also, when a thin plate material is bent in manufacture of the substantially flat surface portion 4'b, a bent rounded portion (bent portion 4'd) is liable to become thinner, so that this portion is suitable as a base portion of flexure of a leaf spring. Therefore, when the thickness of this bent portion 4'd is regulated, a flexure load on the leaf spring can be regulated (Fourth Mode of Embodiment)

The solenoid valve according to a fourth embodiment of the present invention will now be described referring to FIG. 6. In this embodiment, the construction except a collar of a sleeve 4 is identical with the second embodiment. Therefore, they only will be described in detail, and a description of the other construction will be omitted.

Figure 6:
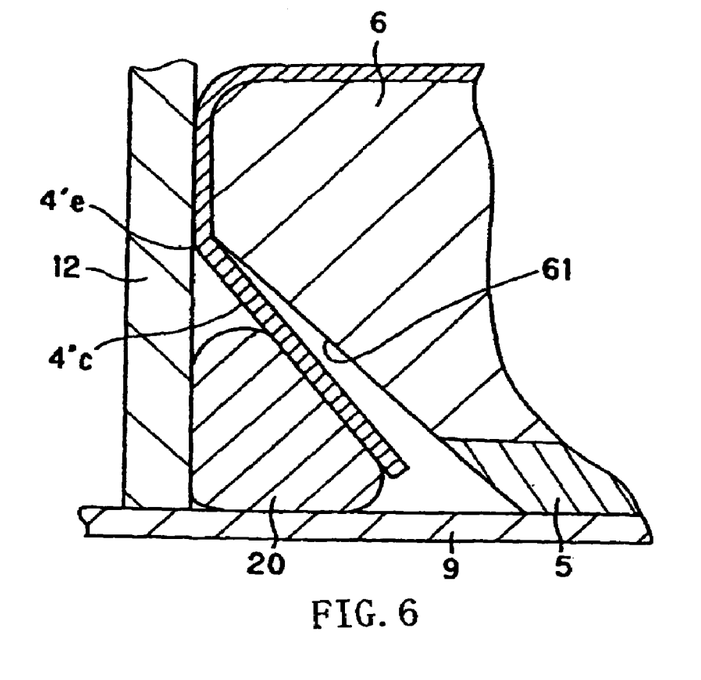
FIG. 6 is a schematic construction diagram in section showing a seal member in an installed state in a fourth embodiment of the present invention.

FIG. 6 is a schematic construction diagram in section showing a seal member in an installed state of the fourth embodiment of the present invention.

In this embodiment, an end portion (portion having an inclined surface 4'c) of the collar of the sleeve 4 is made elastically deformable in the same manner as in the above-described third embodiment. Namely, a bent portion 4'e, which is a root portion of the inclined surface 4'c, includes a base point where a power is received, and the end portion of the collar is formed as a flexible leaf spring.

When the seal member 20 (O-ring) is installed in such an arrangement, the end portion of the collar is pressed and bent. As a result, the seal member 20 is pressed by an elastic resilience of the end portion of the collar.

Therefore, the effect identical with that in the above-described third embodiment becomes possible to be obtained.

In the fourth embodiment, an end surface 61 of a bobbin 6 is made to function as a restricting portion for holding a deformation region of the end portion of the collar within an elastic range.

INDUSTRIAL APPLICABILITY

As described above, the present invention is capable of preventing the entry of the water (contaminants), which causes a poor insulation of the coil and the short-circuiting, from the outside and the leakage of a fluid from the inside, by one seal member, simplifying the construction of the solenoid valve and reducing the dimensions and weight while maintaining the sealing performance between the inner and outer portions of the main body.

Since the annular space portion is formed to a substantially cylindrical shape in which a seal member, which is provided with a seal portion, contact portion and a position restricting portion in installed, a sufficient sealing performance can be delivered even with respect to variation in the dimensions of the annular space especially in the axial direction.

When the annular space is formed to a substantially triangular cross-sectional shape in which an O-ring is installed, the construction can be more simplified.

When at least a part of the outer wall forming the seal space is made of an elastically deformable plate type member, by an elastic resilience of which the seal member is pressed, a variation of the dimensions of the seal member and seal space can be absorbed, and a more stable sealing performance is delivered.

What is claimed is:

1. A solenoid valve provided with:
   a substantially cylindrical coil adapted to generate a magnetic field when it is energized,
   a center post provided concentrically with the cylindrical coil,
   a plunger adapted to be magnetically attracted to the center post by a magnetic field generated by the coil,
   a substantially bottomed cylindrical metal sleeve provided so as to cover an outer circumferential surface of the center post and plunger,
   a metal plate provided in the vicinity of an opening end of the sleeve and having a substantially flat surface portion extending to radial direction, and
   a metal case member containing the coil, center post, plunger, sleeve and plate, the solenoid valve comprising
   a collar provided on the sleeve and extending toward an inner circumferential surface of the case member,
   an annular space formed among one surface of the collar, an inner circumferential surface of the case member and a substantially flat surface portion of the plate, and
   a seal member provided in the space and adapted to seal each of one surface of the collar, the inner circumferential surface of the case member and the substantially flat surface portion of the plate.

2. A solenoid valve according to claim 1, wherein the annular space is formed to a substantially cylindrical shape by the outer circumferential surface formed by extending the collar in the direction separating from the plate, and the substantially flat surface portion formed by bending the end portion of this outer circumferential surface toward the inner circumferential surface of the case member,     the seal member being provided with:

a seal portion which forms a first seal surface with the substantially flat surface portion of the plate,         a contact portion contacting the substantially flat surface portion of the collar, and         a position restricting portion adapted to be brought into contact with the outer circumferential surface portion of the collar and restricting a radial inward movement,     at least either one of the seal portion and contact portion being rendered flexibly deformable toward the inner circumferential surface of the case member, and forming a second seal surface with the inner circumferential surface of the case member,     a third seal surface being formed between at least either one of the contact portion and position restricting portion and the collar.

3. A solenoid valve according to claim 1, wherein the annular space is formed to a substantially triangular cross-sectional shape by inclining the collar so that the collar becomes distant from the plate from a position in which the collar contacts the plate toward the inner circumferential surface of the case member,     the seal member being made of an O-ring adapted to seal each of the inclined surface of the collar, the inner circumferential surface of the case member and the substantially flat surface portion of the plate.

4. A solenoid valve according to claim 1, wherein at least a part of the collar is made of an elastic material capable of being elastically deformed,     the collar being disposed so that the seal member is pressed by an elastic resilience of the collar.

* * * * *